United States Patent [19]

Weon

[11] Patent Number: 5,095,615
[45] Date of Patent: Mar. 17, 1992

[54] APPARATUS FOR TRANSFERRING SCREW MEMBERS

[75] Inventor: Kyung-Seup Weon, Suwon, Rep. of Korea

[73] Assignee: SamSung Electronics Co., Ltd., Suwon, Rep. of Korea

[21] Appl. No.: 540,136

[22] Filed: Jun. 19, 1990

[30] Foreign Application Priority Data

Jun. 20, 1989 [KR] Rep. of Korea ............... 89-8501[U]

[51] Int. Cl.⁵ .............................................. B23Q 7/10
[52] U.S. Cl. ...................................... 79/785; 79/795; 79/809
[58] Field of Search ................... 414/224, 753; 29/809, 29/771, 785, 795

[56] References Cited

U.S. PATENT DOCUMENTS

| | | | |
|---|---|---|---|
| 4,700,471 | 10/1987 | Shemeta et al. | 29/809 |
| 4,708,612 | 11/1987 | Pape | 29/809 X |
| 4,715,114 | 12/1987 | Yajima | 29/809 |
| 4,891,879 | 1/1990 | DeLange | 29/809 X |
| 4,899,907 | 2/1990 | Benani | 29/809 X |

Primary Examiner—Timothy V. Eley
Attorney, Agent, or Firm—Robert E. Bushnell

[57] ABSTRACT

Apparatus for transferring screws at a time in a set is disclosed. The apparatus is composed of an supplying plate, fingers and four kinds of cylinders. The first cylinder is to stop the supplying plate for supplying screws in a set, the fingers grip the screws, the second cylinder controls gripping of the fingers, the third cylinder controls the fingers vertically, the fourth cylinder controls the fingers horizontally. The apparatus transfers screws from the supplying plate to a screw receiver inclusive of multiple suppliers through vertical -horizontal- vertical movements sequentially. The suppliers supply screws to home appliances for assembling.

24 Claims, 5 Drawing Sheets

APPARATUS FOR TRANSFERRING SCREW MEMBERS

BACKGROUND OF THE INVENTION

1. Field of the Invention

The present invention relates to an apparatus for transferring screw members. More particularly, it relates to an apparatus which transmits the screw members automatically and the apparatus is suitable for supplying a set of screws at a time.

2. Description of the Background Art

Screw members for assembling home appliances are handled and manufactured by manual work.

A transferring means of screw members is disclosed in Japanese Utility Model laid open publication No. 8076/87. The Japanese reference relates to a power transmission apparatus for coupling parts automatically. It transmits power from a motor to driver bit through a guide pin and a connecting member. The power also transmits screw members along a guide rail from a feeder.

In this disclosure the screw members are supplied along the guide rail, the screw members can't keep a certain predetermined spaces between each other.

SUMMARY OF THE INVENTION

The object of the present invention is to solve the above problem and to supply an apparatus for transferring screw members. Present invention comprises a drive means, a rotated means, a brake means, a finger means, a first moving means and a second moving means.

The drive means is composed of a motor and a first gear. The rotated means is composed of a second gear and a rotated plate, which supplies screw members at top part of the apparatus. The second gear is tooth coupled with the first gear, the rotated plate is rotated by friction resistance with the second gear.

The brake means stops the rotated means every one rotation by means of a first cylinder and a stopper. The pincer means or finger means is composed of a pincer or a finger, a bearing, a push plate, a lower plate and a second cylinder, which is located at the same vertical position of the supplied screw member. The finger means is fixed at the surface of the lower plate enough to spread the finger. The first moving means is attached at the upper plate and positioning the finger means up and down by means of a third cylinder.

The second moving means moves the finger means and the first moving means in a body to left and right positions by means of a fourth cylinder, whereby the finger means grips the supplied screw members and then transmits it to a screw receiving and injecting means.

The screw receiving and injecting means comprises a horizontal member and a vertical member. The horizontal member has suppliers of the same numbers of the fingers, which have horizontal orifices for supplying the compressed air to the suppliers respectively. The vertical member supports the horizontal member, which supplies the compressed air to the suppliers through the horizontal orifice. The suppliers are opposite to the fingers, each supplier is a vertical orifice and each horizontal orifice is penetrated into an upper side wall of each supplier.

BRIEF DESCRIPTION OF THE DRAWINGS

The foregoing and other objects, features and advantages of the present invention should become apparent from the following description taken in conjunction with the accompanying drawings, in which.

DETAILED DESCRIPTION OF THE INVENTION

Figure 1:
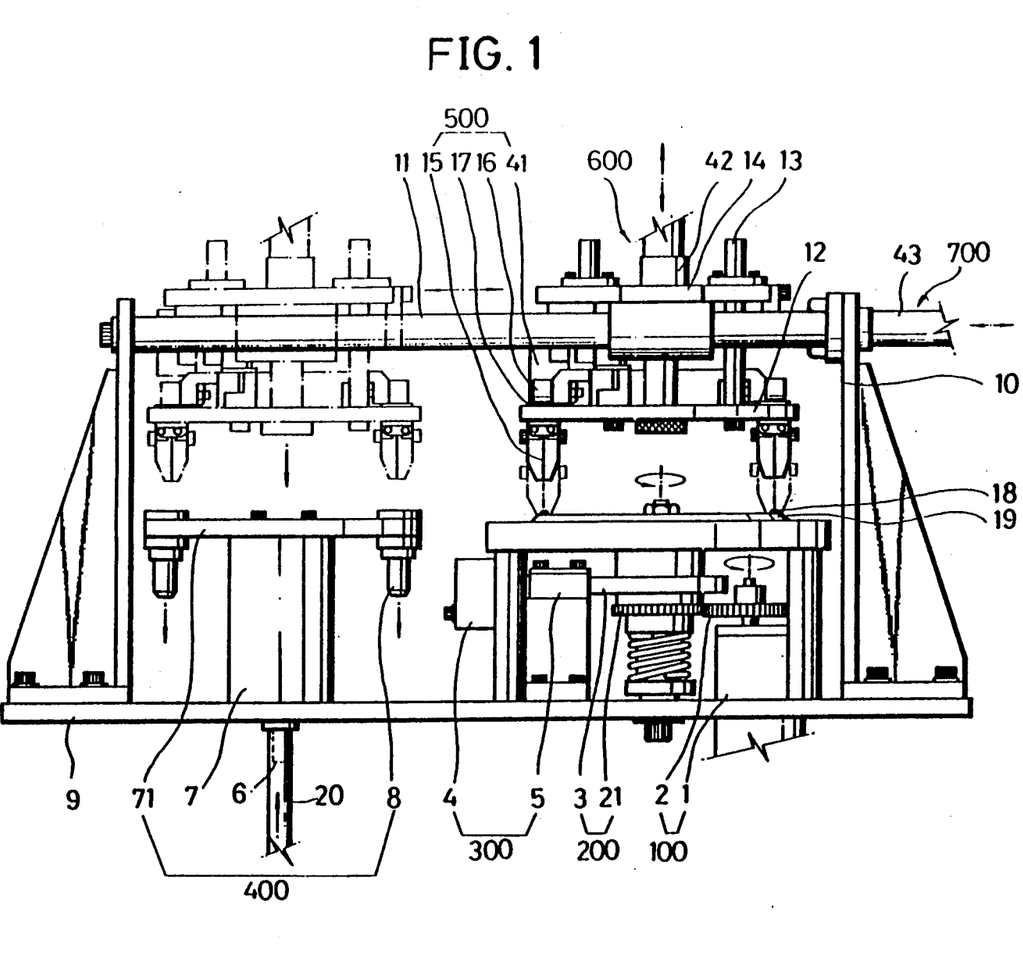
FIG. 1 is a front view of the present invention which illustrates the operation of transferring the screw members.

Referring first to FIG. 1, the apparatus of the present invention for transferring screw members is shown. The invention comprises a drive means 100, a rotated means 200, having a clutch assembly a brake means 300, a receiving and injecting means 400, a finger means 500, a first moving means 600 and a second moving means 700. The drive means 100 comprises a motor 1 and a first gear 2 which is rotated by the motor 1. The rotated means 200 comprises a second gear 21 and a rotated plate 3. The second gear 21 and the rotated plate 3 are attached on a same shaft, the second gear 21 is tooth coupled with the first gear 2. A supplying plate 19 supplies screw members 18 at a rate sufficient to supply the same number of pincers or fingers 15 at a time. The supplying plate 19 is attached on a top part of the rotated plate 3. The brake means 300 is attached at a side of the rotated plate 3 and comprises a first cylinder 4 and a stopper 5 operated by the first cylinder 4. The finger means 500 is fixed on a lower plate 12 and so the first moving means 600 is fixed slidably by a guide member 11. The guide member 11 is supported by a supporting frame 10 and the lower part of supporting frame 10 is mounted on the base plate 9. The finger means 500 is composed of a finger 15, a bearing 16, a push plate 17 and a second cylinder 41 in a set and is fixed at a lower plate 12 and also the finger means 500 is present in the same number as the screw members 18 supplied into the supplying plate 19.

The first moving means 600 is mainly comprised of a third cylinder 42 which is attached in the center of an upper plate 14. A rod end of the third cylinder 42 is fixed on the lower plate 12 so as to push and pull the lower plate 12.

Figure 2:
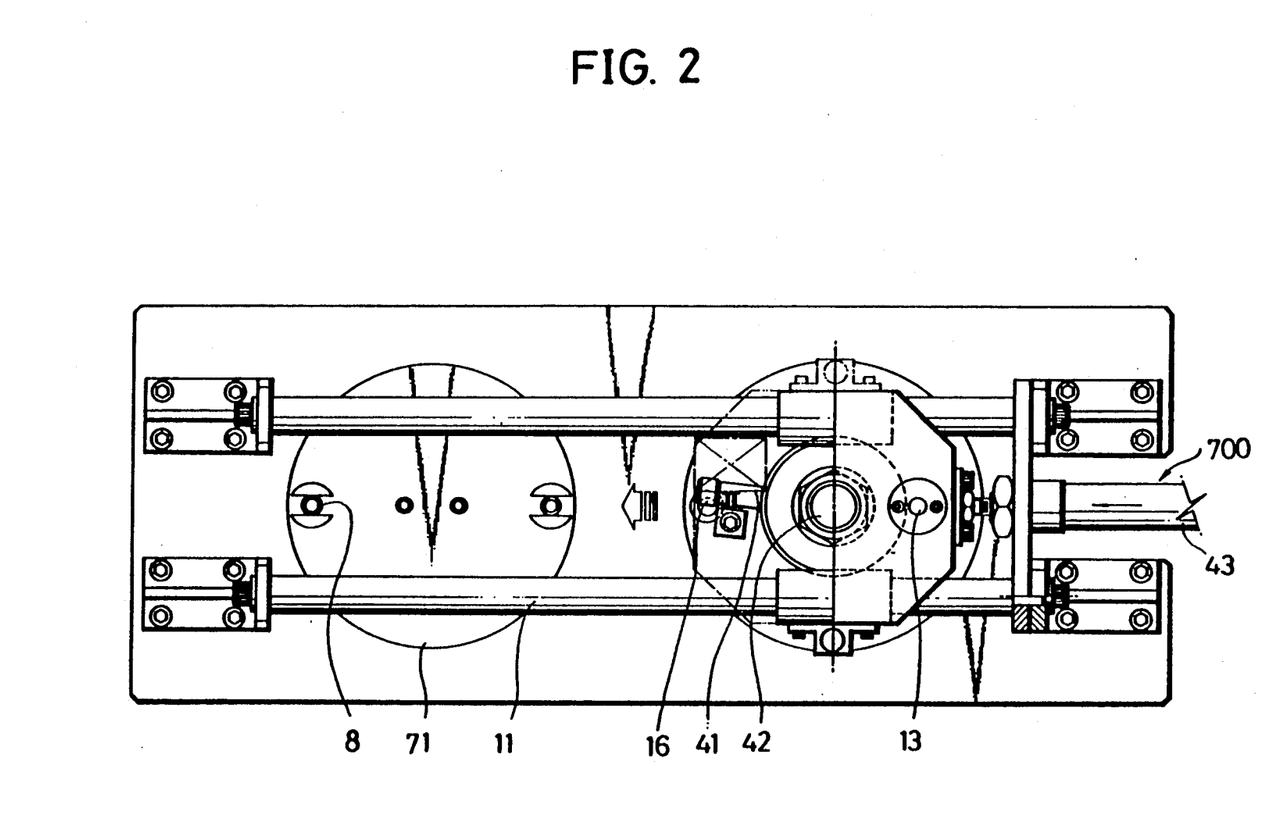
FIG. 2 is a top view of the FIG. 1.

A guide bar 13 is fixed at the lower plate 12 and is inserted slidably into the upper plate 14 for the exact up-down operation of the lower plate 12. The second moving means 700 is composed of a fourth cylinder 43 and moves the finger means 500 and the first moving means 600 to left and right positions. The screw receiving and injecting means 400 is mainly comprised of a vertical member 7 and a horizontal member 71. Lower part of the vertical member 7 is fixed at the base plate 9 and also an air nozzle 6 supplies compressed air, which is supplied through a hose 20, into a vertical member 7. The horizontal member 71 is located at upper part of the vertical member 7 and also suppliers 8 are formed at the same vertical positions as the fingers 15 drawn in a dotted line. Referring to FIG. 2, a top view of the present invention is shown. The upper plate 14 is fixed slidably at a parallel guide members 11 and is moved from side to side by second moving means 700.

Figure 3:
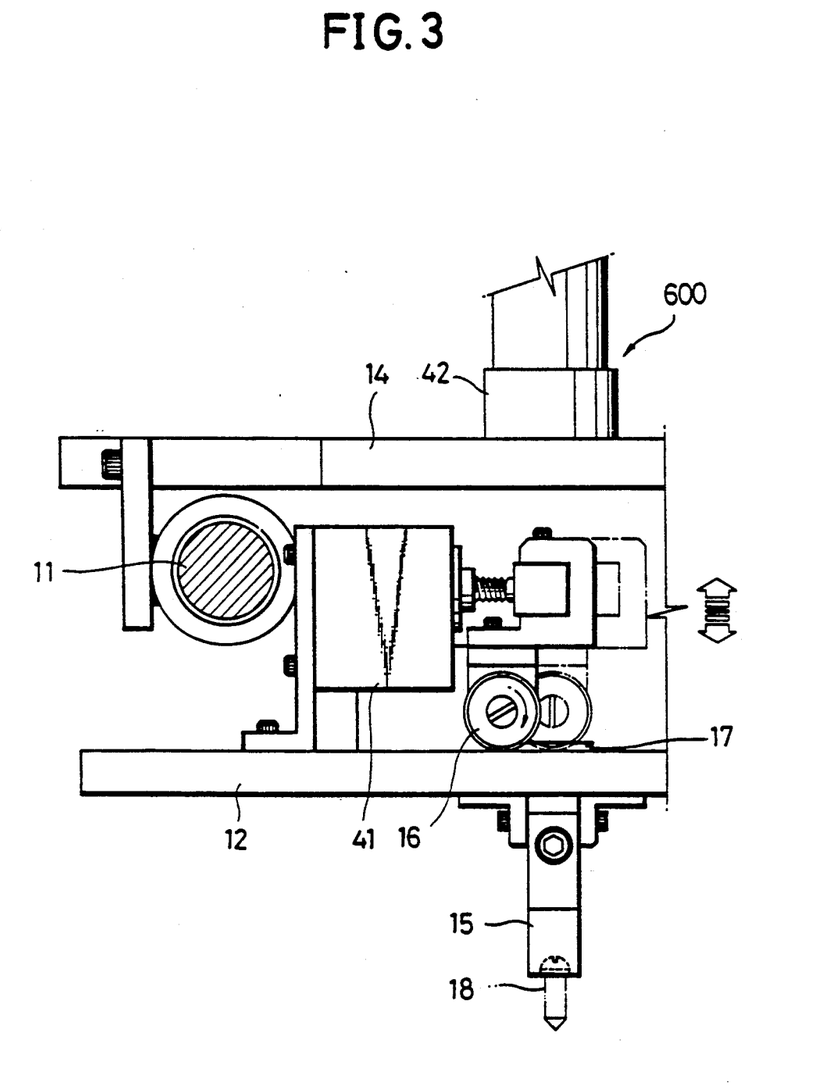
FIG. 3 is a side view of a finger means which illustrates the operation of a finger.

A pair of guide bars 13 are fixed slidably into each side of the upper plate 14. The third cylinder 42 is fixed at the center of the upper plate 14. The second cylinder 41 is attached on a lower plate 12 and a bearing 16 is attached so as to push a push plate 17 at a rod end of the second cylinder 41. A horizontal member 71 is located at the left side of a base plate 9 and also two suppliers are fixed so as to receive screw members transferred from fingers in the horizontal member 71. Referring to FIG. 3, a finger means is shown.

A second cylinder 41 is attached at the lower plate 12 and a bearing 16 is attached so as to push a push plate 17 at lower end of a rod of the second cylinder 41. The upper plate 14 is fixed slidably by a guide member 11. A finger 15 is spread by the pushing of the push plate 17. Screw 18 is shown.

Figure 4:
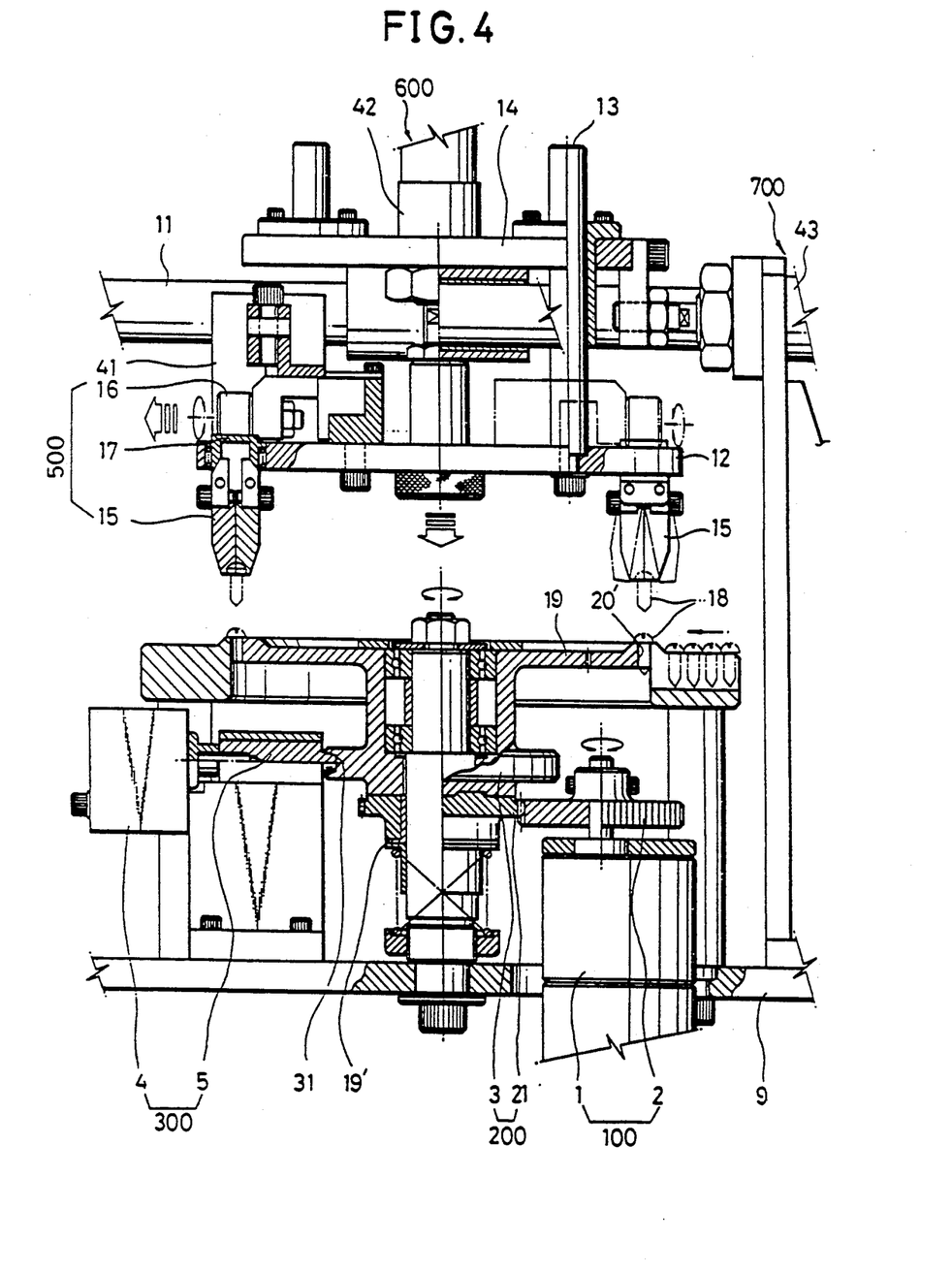
FIG. 4 is a partially sectional view of a drive means, a rotated means, a brake means and a finger means.

Referring to FIG. 4, a partially enlarged sectional view of the present invention is shown. FIG. 4 is drawn as a half sectional view for the convenience of the easy understanding.

As FIG. 4 is similar to FIG. 1, FIG. 4 identifies only the details. A motor 1 is fixed at a base plate 9 and also a second gear 21 and a rotated plate 3 is tooth coupled in a body on the same shaft. A friction bushing 19' is fixed for reducing the inertia force between the second gear 21 and the shaft. A groove 31 is formed at a periphery of the rotated plate 3 and so a stopper 5 is inserted for stopping rotation of the rotated plate 3 into the groove 31.

A supplying plate 19 has supplying holes 20' at its periphery and the supplying holes 20' have are present in the same number as the fingers 15. The screw members 18 are supplied by extra supplier (not shown) and are fixed into the supplying sites or holes 20' every one rotation of the supplying plate 19.

The finger means 500 have the same number as the supplying holes 20. A push plate is fixed as a spring into a lower plate 12 and lower part of the push plate 17 is contacted slidably so as to spread the finger 15 with upper end of the finger 15.

Figure 5:
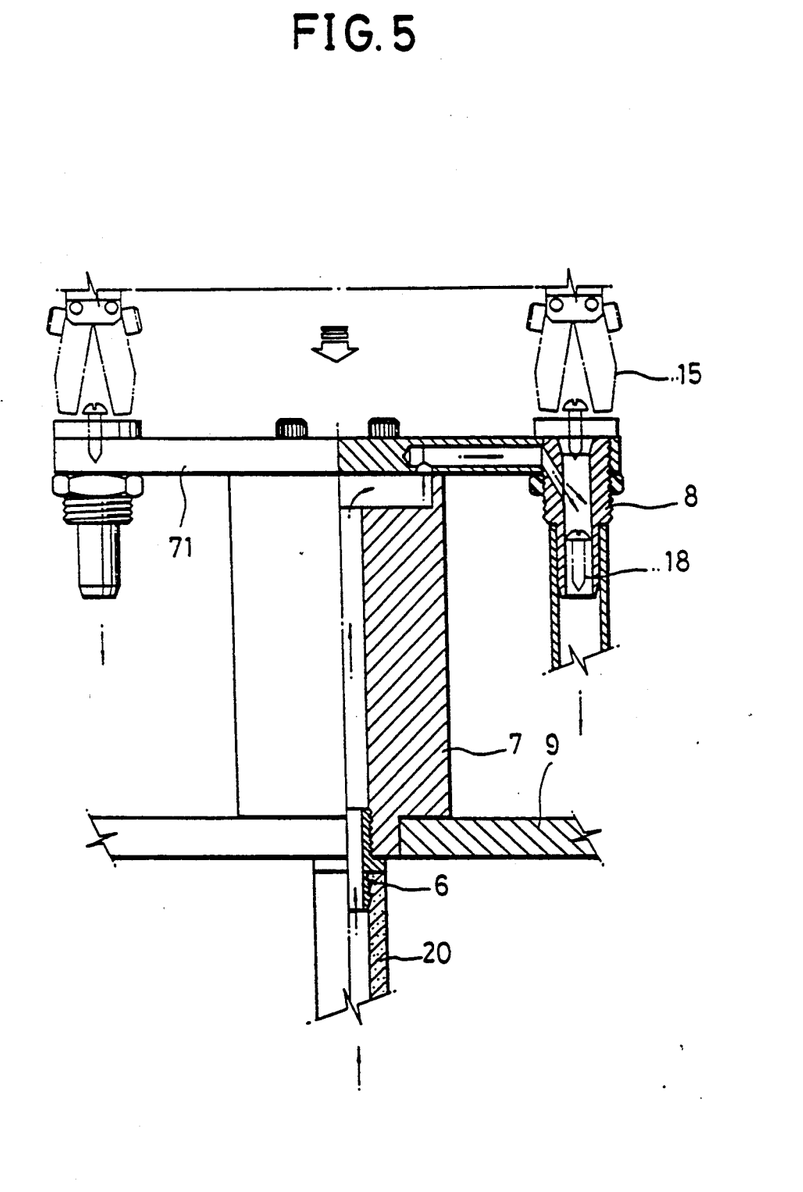
FIG. 5 is an enlarged half sectional view of a screw receiving and injecting means of the present invention.

Referring to FIG. 5, a screw receiving and injecting means 400 is shown. The screw receiving and injecting means 400 is mainly comprises an air nozzle 6, vertical member 7 and a horizontal member 71. The vertical member 7 is fixed on a base plate 9 and also it has a vertical orifice therein so as to receive compressed air. The air nozzle 6 is attached at inlet of the vertical member 7 and also a hose 20 is fixed at the air nozzle 6. The horizontal member 71 is fixed on the vertical member 7 and have suppliers 8 corresponding with the fingers 15. Each suppliers 8 is a vertical pipe type. Multiple horizontal orifices, which penetrate through the vertical orifice, are formed in the horizontal member 71. Each of the suppliers 8 is also penetrated slantingly by slanting orifices.

In operating, screw members 18 are supplied to the supplying plate 19 by a screw feeder (not shown) and then, if a user turns on the motor 1, the first gear 2 is rotated as shown in FIG. 4. As the first gear 2 and the second gear 21 are tooth coupled, the second gear 21, the rotated plate 3 and the supplying plate 19 are rotated in a body. But the rotated plate 3 has a groove 31 such that the cylinder 4 pushes the stopper 5 every one rotation of the rotated plate 3. When the stopper 5 is inserted into the groove 31, the rotated plate 3 is stopped by the stopper 5. As the supplying plate 19 has supplying holes 20' at its periphery, supplied screw members 18 are inserted into the supplying holes 20' every one rotation of the rotated plate 3.

At that time, the second cylinder 41 is operated and so the bearing 16 inclusive of cylinder rod moves toward two dotted line position as in FIG. 3. As the bearing 16 pushes the push plate 17, each of the fingers 15 is spreaded and then the third cylinder 42 pushes the lower plate 12 from normal state to the supplying plate 19. Then, the second cylinder 41 pulls the bearing 16 and so each of the fingers 15 grips each of the screw members 18. Then, the third cylinder 42 pulls the lower plate 12 and stops at the normal state. Guide bars 13 are fixed at the lower plate 12, which are slidably moved into the upper plate 14 and aid up-down operations of the lower plate 12.

After the third cylinder 42 stops at the normal state wherein each of the fingers 15 grips each of the screw members 18, the fourth cylinder 43 starts moving and so the finger means 500 inclusive of the first moving means 600 moves to a dotted line position as in FIG. 1.

Then, the third cylinder 42 pushes the lower plate 12 to the extent that the fingers 15 inclusive of screw members 18 approach the inlet of the suppliers 8. Then, the second cylinders 41 operate the bearings 16 respectively and so the fingers 15 are spreaded as in FIG. 5. Accordingly, screw members 18 are supplied to the suppliers 8 respectively.

When the fingers 15 approach the suppliers 8, the compressed air is supplied to the suppliers 8. As screw members 18 are supplied into the suppliers 8, the compressed air transfers screw members 18 to home appliances i.e., microwave oven, etc.. The supplied screw members 18 can be adapted for a microwave oven in assembling with screw members. That is to say, for assembling the home appliances, the required screw members 18 are supplied to positions for driving the screw members simultaneously.

The present invention omits courses for supplying screw members 18 to home appliances in drawings.

After screw members 18 are supplied to the suppliers 8, the second cylinders 41 pull the bearings 16 respectively and each of the fingers 15 comes to a grip state. At the same time, the third cylinder 42 pulls the lower plate 12 to a normal state and then, the finger means 500 inclusive of the first moving means 600 is moved to the original position by the fourth cylinder 43. And repeats transferring of the screw members as stated above.

Reciprocal operations of each cylinder is well-known in the art, so in this application the mutual operations are not illustrated in detail.

Accordingly, the invention can supply automatically a set of screw members simultaneously to home appliances in assembling procedures and, thereby, reduce the working hours to assemble such appliances.

What is claimed is:

1. Apparatus for transferring screw members comprising:
   drive means including a motor and a first gear;
   rotated means including a second gear and a supply plate, said supply plate supplying screw members having heads raised above said supply plate, said second gear having teeth coupled with teeth of the first gear, said supply plate being rotated by said first gear via friction resistance of the second gear;
   brake means for stopping rotation of the rotated means every one rotation by means of a first cylinder and a stopper;

finger means including a finger, a bearing, a push plate, a lower plate and a second cylinder, said finger being located at a vertical position directly above the screw members supplied by said supply plate, said finger being mounted on a lower surface of the lower plate wherein said second cylinder moves said bearing over and in contact with said push plate, whereby said push plate is lowered enough to open the finger;

first moving means being attached to an upper plate for moving the finger means vertically by means of a third cylinder; and second moving means which for moving the finger means and the first moving means together to first and second horizontal positions, wherein the finger means grips the supplied screw members when said first moving means lowers then raises said finger means while in said first horizontal position, wherein said second moving means moves said finger means and said first moving means to said second horizontal position and wherein said first moving means lowers said finger means while in said second horizontal position for supplying the screw members to a screw receiving and injecting means.

2. Apparatus for transferring screw members as claimed in claim 1, wherein said finger means includes a plurality of fingers and wherein the screw receiving and injecting means comprises:

a horizontal member including a plurality of suppliers corresponding to said plurality of fingers, said horizontal member inlcuding a corresponding plurality of horizontal orifices for supplying compressed air to the plurality of suppliers, respectively; and a vertical member which supports the horizontal member, said vertical member including a vertical orifice for supplying the compressed air to the suppliers through the plurality of horizontal orifices.

3. Apparatus for transferring screw member as claimed in claim 2, wherein each of the suppliers are positioned vertically below a corresponding one of the fingers, each supplier is a vertical pipe and each horizontal orifice is correspondingly aligned with a slant orifice penetrating through an upper side wall of each of the suppliers.

4. An apparatus for receiving screw means, for aligning said screw means for mounting and for injecting said screw means into a component of manufacture, said apparatus comprising:

first means, mounted on a base plate, for receiving said screw means, said first means having a supply plate, said supply plate having a plurality of concavities spaced apart from each other along said supply plate's circumferential edge for receiving said screw means;

second means for rotating said supply plate thereby enabling each said concavities to receive said screw means;

third means slidably mounted above said supply plate, said third means having a plurality of gripping means for gripping said screw means, wherein each of said gripping means lifts a corresponding one of said screw means clear of said supply plate; and fourth means, mounted on said base plate, for receiving said screw means from said plurality of gripping means, wherein said fourth means has a plurality of suppliers corresponding to said plurality of gripping means and means for supplying compressed air to said suppliers for injecting said screw means into said component of manufacture.

5. The apparatus as claimed in claim 4, wherein said second means comprises:

a first gear;

a motor for rotating said first gear; and breaking means.

6. The apparatus as claimed in claim 5, wherein said first means further comprises:

a shaft connected to said supply plate;

a second gear mounted to said shaft and connected to said first gear; and a rotated plate mounted to said shaft;

wherein said motor rotates said supply plate via said first and second gears, and wherein said breaking means contacts said rotated plate for stopping rotation of said supply plate.

7. The apparatus as claimed in claim 6, wherein said rotated plate has a grooved periphery and said breaking means comprises a stopper, said stopper being insertable into said grooved periphery for stopping said rotation of said supply plate.

8. The apparatus as claimed in claim 7, wherein said screw means are received by each one of said concavities every one rotation of said supply plate, and said breaking means stops said rotation of said supply plate every one turn.

9. The apparatus as claimed in claim 4, wherein said third means comprises:

first plate means to which said gripping means are attached;

second plate means slidably attached to horizontal guiding bars;

vertical guiding bars, attached to said first plate means through said second plate means, for vertically guiding said first plate means; and moving means having a first cylinder means attached to said second plate means, wherein said first cylinder means includes a cylinder rod attached to said first plate means through said second plate means for lowering and raising said first plate means.

10. The apparatus as claimed in claim 9, wherein said first plate means comprises:

a plurality of push plate means, each of said push plate means corresponding to each of said gripping means, slidably and elastically mounted above said gripping means for causing said gripping means to open and close;

a plurality of bearing means, corresponding to said push plate means, for causing said push plate means to open and close said gripping means;

a plurality of second cylinder means for horizontally moving said bearing means into a plurality of positions, wherein one of said positions is over said push plate means for causing said gripping means to open and another of said positions is away from said push plate means for causing said gripping means to close.

11. The apparatus as claimed in claim 4, wherein said fourth means comprises a vertical support means mounted to said base plate, wherein said vertical support means includes a vertical orifice for receiving compressed air and horizontal means mounted on said vertical support means, wherein said suppliers are supported by said horizontal means, and wherein said means for supplying compressed air comprises:

an air nozzle connected to an inlet of said vertical orifice through said base plate; and hose means connected to said air nozzle for providing said compressed air to said vertical orifice;

wherein said horizontal means includes a horizontal orifice having an inlet aligned with an outlet of said vertical orifice for receiving said compressed air and an outlet for supplying said compressed air to said suppliers.

12. The apparatus as claimed in claim 11, wherein each of said suppliers is a vertical pipe means including:

a first opening for receiving said screw means from said gripping means;

a second opening for discharging said screw means for injection into said component of manufacture; and a slanting orifice through a side of said vertical pipe means, wherein an inlet of said slanting orifice is aligned with said outlet of said horizontal orifice for receiving said compressed air and an outlet of said slanting orifice supplies said compressed air to said screw means, received by said vertical pipe means from said gripping means, for forcing said screw means from said vertical pipe means.

13. An apparatus for transferring screw members comprising:

drive means including a motor and a first gear;

rotated means including a second gear and a rotated plate, said rotated plate supplying screw members having heads raised above said rotated plate, said second gear having teeth coupled with teeth of the first gear, said rotated plate being rotated by said first gear via friction resistance of the second gear;

brake means for stopping rotation of the rotated means every one rotation by means of a first cylinder and a stopper;

pincer means, mounted on a lower plate, said pincer means including a plurality pincers, bearings, push plates and second cylinders, each of said pincers being located at a vertical position directly above a corresponding screw member supplied by said rotated plate, said pincers being mounted on a lower surface of the lower plate, wherein each said second cylinder moves a corresponding one of said bearings over and in contact with a corresponding one of said push plates, whereby each said push plate is lowered enough to open a corresponding one of said pincers;

first moving means being attached to an upper plate for moving the pincer means vertically by means of a third cylinder; and second moving means for moving the pincer means and the first moving means together to first and second horizontal positions, wherein the pincer means grips the supplied screw members when said first moving means lowers then raises said pincer means while in said first horizontal position, wherein said second moving means moves said pincer means and said first moving means to said second horizontal position and wherein said first moving means lowers said princer means while in said second horizontal position for supplying the screw members to a screw receiving and injecting means.

14. The apparatus for transferring screw members as claimed in claim 13, wherein the screw receiving and injecting means comprises:

a horizontal member including a plurality of suppliers corresponding to said plurality of pincers, said horizontal member including a corresponding plurality of horizontal orifices for supplying compressed air to the plurality of suppliers, respectively; and a vertical member which supports the horizontal member, said vertical member including a vertical orifice for supplying the compressed air to the suppliers through the plurality of horizontal orifices.

15. The apparatus for transferring screw member as claimed in claim 14, wherein each of the suppliers are positioned vertically below a corresponding one of the pincers, each supplier being comprised of a vertical pipe, and each horizontal orifice is correspondingly aligned with a slant orifice pentrating through an upper side wall of each of the vertical pipes.

16. An apparatus for receiving screw means and for injecting said screw means into a component of manufacture, said apparatus comprising:

a rotatable supply plate having a plurality of sites spaced apart from each other along said supply plate's circumferential edge for receiving said screw means;

means for rotating and stopping said supply plate thereby enabling each of said sites to receive said screw means;

means, slidably mounted above said supply plate, having a plurality of finger means for gripping said screw means, wherein each of said finger means lifts a corresponding one of said screw means clear of said supply plate;

means including a plurality of supply pipe means corresponding to said plurality of finger means for receiving said screw means from said plurality of finger means; and means for supplying compressed air to said supply pipe means for injecting said screw means into said component of manufacture.

17. The apparatus as claimed in claim 16, wherein said means for rotating and stopping said supply plate comprises:

a first gear;

a motor for rotating said first gear; and breaking means.

18. The apparatus as claimed in claim 17, wherein said means for rotating and stopping said supply plate further comprises:

a shaft connected to said supply plate;

a second gear mounted to said shaft and contacting said first gear; and a rotated plate mounted to said shaft;

wherein said motor rotates said supply plate via said first and second gears, and wherein said breaking means contacts said rotated plate for stopping rotation of said supply plate.

19. The apparatus as claimed in claim 18, wherein said rotated plate has a grooved periphery and said breaking means comprises a stopper, said stopper being insertable into said grooved periphery for stopping said rotation of said supply plate.

20. The apparatus as claimed in claim 19, wherein said screw means are received by each of said sites every one rotation of said supply plate, and said braking means stops said rotation of said supply plate every one turn.

21. The apparatus as claimed in claim 20, wherein said means slidably mounted above said supply plate comprises:
- first plate means to which said finger means are attached;
- second plate means slidably attached to horizontal guiding bars;
- vertical guiding bars, attached to said first plate means through said second plate means, for vertically guiding said first plate means; and
- moving means having a first cylinder means attached to said second plate means, wherein said first cylinder means includes a cylinder rod attached to said first plate means through said second plate means for lowering and raising said first plate means.

22. The apparatus as claimed in claim 21, wherein said first plate means comprises:
- a plurality of push plate means, each of said push plate means corresponding to each of said finger means, slidably and elastically mounted above said finger means for causing said finger means to open and close;
- a plurality of bearing means, corresponding to said push plate means, for causing said push plate means to open and close said finger means;
- a plurality of second cylinder means for horizontally moving said bearing means into a plurality of positions, wherein one of said positions is over said push plate means for causing said finger means to open and another of said positions is away from said push plate means for causing said finger means to close.

23. The apparatus as claimed in claim 4, wherein said means including a plurality of supply pipe means comprises a vertical support means mounted to said plate, wherein said vertical support means includes a vertical orifice for receiving said compressed air and horizontal means mounted on said vertical support means, wherein said supply pipe means are supported by said horizontal means, and wherein said means for supplying compressed air comprises:
- an air nozzle connected to an inlet of said vertical orifice; and
- hose means connected to said air nozzle for providing said compressed air to said vertical orifice;
- wherein said horizontal means includes a horizontal orifice having an inlet aligned with an outlet of said verticle orifice for receiving said compressed air and an outlet for supplying said compressed air to said supply pipe means.

24. The apparatus as claimed in claim 23, wherein each of said supply pipe means include:
- a first opening for receiving said screw means from said finger means;
- a second opening for discharging said screw means for injection into said component of manufacture; and
- a slanting orifice through a side of said supply pipe means, wherein an inlet of said slanting orifice is aligned with said outlet of said horizontal orifice for receiving said compressed air and an outlet of said slanting orifice supplies said compressed air to said screw means, received by said vertical pipe means from said finger means, for forcing said screw means from said supply pipe means.

* * * * *

UNITED STATES PATENT AND TRADEMARK OFFICE
CERTIFICATE OF CORRECTION

PATENT NO. : 5,095,615
DATED : March 17, 1992
INVENTOR(S) : Kyung-Seup Weon It is certified that error appears in the above-identified patent and that said Letters Patent is hereby corrected as shown below:

On the title page, in the ABSTRACT, line 2, replace "an supplying" with --a supplying--.

Column 1, line 25, replace "can't" with --can not--.
Column 2, line 23, delete "a" (second occurrence).
Column 3, line 33, delete "have".
Column 4, line 8, replace "spreaded" with --spread--;
          line 26, replace "spreaded" with --spread--.

Column 7, line 38, insert --of-- after "plurality".

Signed and Sealed this

Sixth Day of July, 1993

*Attest:*

MICHAEL K. KIRK

*Attesting Officer*    *Acting Commissioner of Patents and Trademarks*